United States Patent [19]

Sato et al.

[11] Patent Number: 4,856,058
[45] Date of Patent: Aug. 8, 1989

[54] OFFICE LINE INTERFACE CIRCUITS

[75] Inventors: Yasuji Sato, Hachioji; Fumio Hino, Tama, both of Japan

[73] Assignee: Kabushiki Kaisha Toshiba, Kawasaki, Japan

[21] Appl. No.: 188,101

[22] Filed: Apr. 27, 1988

Related U.S. Application Data

[63] Continuation of Ser. No. 780,817, Sep. 27, 1985, abandoned.

[30] Foreign Application Priority Data

Sep. 28, 1984 [JP] Japan ................. 59-204686

[51] Int. Cl.$^4$ .............................................. H04M 7/00
[52] U.S. Cl. ................................... 379/394; 379/387; 379/402; 379/392
[58] Field of Search ............... 379/387, 388, 389, 390, 379/391, 392, 394, 395, 398, 399, 400, 401, 402, 403, 404, 405, 406, 165, 156, 157, 158, 338, 340, 344, 345, 324, 413, 412, 201, 202, 166

[56] References Cited

U.S. PATENT DOCUMENTS

| | | | |
|---|---|---|---|
| 1,756,816 | 4/1930 | Dolmago | 379/340 |
| 3,748,399 | 7/1973 | Matsuda et al. | 379/395 |
| 3,914,560 | 10/1975 | Greene | 379/340 X |
| 3,953,676 | 4/1976 | Brown | 379/390 |
| 4,004,102 | 1/1977 | Ott | 379/398 |
| 4,056,688 | 11/1977 | Stiefel | 379/398 X |
| 4,132,863 | 1/1979 | Smith | 379/398 X |
| 4,359,609 | 11/1982 | Apfel | 379/398 |
| 4,515,996 | 5/1985 | Burgin | 379/395 X |
| 4,538,032 | 8/1985 | Ballatore et al. | 379/398 |

OTHER PUBLICATIONS

"Understanding Telephone Electronics", Radio Shack, Fort Worth, Tex., 76102, 1983, FIG. 1-2, FIG. 2-23, pp. 2-24.

Primary Examiner—Jin F. Ng
Assistant Examiner—Randall S. Vaas
Attorney, Agent, or Firm—Finnegan, Henderson, Farabow, Garrett, & Dunner

[57] ABSTRACT

An office line interface circuit includes a DC circuit for extracting a DC signal component from the office line current, an AC circuit for extracting an AC signal component from the office line current to supply the extracted AC signal component to the receiver of a telephone set, an impedance circuit switchably connected to the office line, and a switching circuit for connecting the impedance circuit to the office line when the extracted DC signal component exceeds a predetermined level to maintain at a substantially constant value the impedance of the office line as viewed from the telephone set. With this interface circuit, the sidetone preventing circuit for the telephone system can operate satisfactorily without complicating the construction under any office line condition.

5 Claims, 5 Drawing Sheets

OFFICE LINE INTERFACE CIRCUITS

This application is a continuation of application Ser. No. 780,817 filed Sep. 27, 1985, now abandoned.

BACKGROUND OF THE INVENTION

1. Field of the Invention

This invention relates to an office line interface circuit utilized in a key telephone set or the like, and more particularly an office line interface circuit designed for providing a stable characteristic for the office line impedance of the office line viewed from the side of the telephone sets irrespective of the variation in the office line condition whereby to provide an efficient sidetone suppressing characteristic.

2. Description of the Related Art

Generally in a key telephone system or the like, the office line current from the office line is not passed through the key telephone set, but instead the power is supplied to the key telephone set from an independent power source installed in a main unit. In such a key telephone system, for the purpose of suppressing a sidetone (voice signal sent from a transmitter to a receiver), a so-called sidetone preventing circuit is provided. The sidetone preventing circuit is provided with an impedance circuit whose impedance is equivalent to that of the office line viewed from the key telephone set, and the sidetone can be prevented by balancing the impedance of the impedance circuit and the impedance of the office line.

The impedance of the office line varies greatly depending upon the distance between a position at which a key telephone system, including a main unit and plurality of key telephone sets is installed and a position at which a telephone exchange is installed, whereas the impedance of the impedance circuit is generally fixed, determined in view of the manufacturing cost, etc. For example, the impedance of the impedance circuit is designed such that the sidetone preventing performance can be most efficiently manifested when the key telephone system is installed at its remotest position from the telephone exchange. Accordingly, under a specific office line condition, the sidetone preventing performance is effective, whereas under other office line conditions there is a problem that the sidetone preventing performance degrades.

SUMMARY OF THE INVENTION

Accordingly, it is an object of this invention to provide an improved office line interface circuit capable of efficiently manifesting the sidetone preventing performance under any office line condition.

Another object of this invention is to provide a novel office line interface circuit capable of coping with a variation in various office line conditions without complicating the construction of the side tone preventing circuit of a telephone set.

A further object of this invention is to provide an improved office line interface circuit adapted for use in a telephone system including a plurality key telephone sets that can cope with variations in various office line conditions without complicating the sidetone preventing circuits of respective telephone sets.

According to this invention, these and further objects can be accomplished by providing an office line interface circuit comprising a DC circuit for extracting a DC signal component from office line current, an AC circuit for extracting a AC signal component from the office line current to send the extracted AC signal component to a telephone set, an impedance circuit connected to office lines and an impedance control means for varying the impedance of the impedance circuit in accordance with the level of the extracted DC signal component so as to maintain at a substantially constant value the impedance of the office lines as viewed from the telephone set.

In this manner, since the impedance of the office lines as viewed from the telephone set can be maintained at a substantially constant value, a favorable sidetone preventing effect can be assured irrespective of the variation in the office line condition.

When the invention is applied to a telephone system including a number of key telephone sets, the circuit to be added to the system is not required in each key telephone set, but need be connected to only the office lines connected to the main unit of the key telephone system so that cost of the key telephone system can be reduced.

DESCRIPTION OF THE PREFERRED EMBODIMENTS

Figure 1:
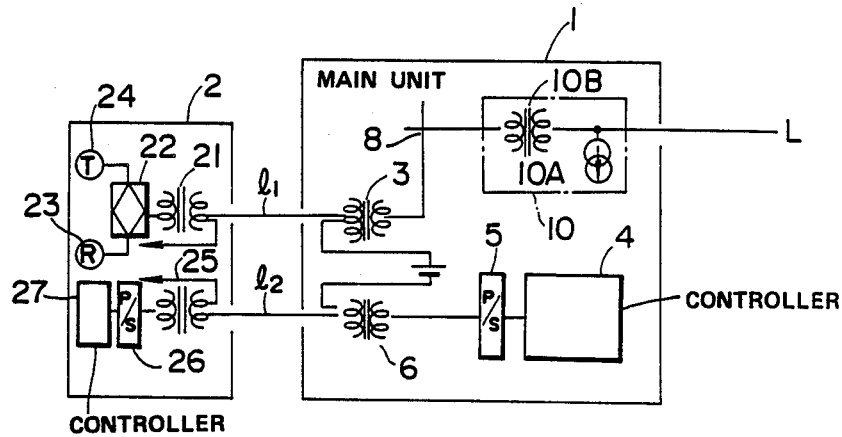
FIG. 1 is a connection diagram showing the basic construction of telephone system set to which the office line interface circuit of this invention is applicable.

A preferred embodiment of this invention will now be described with reference to the accompanying drawings in which identical elements are designated by the same reference numerals and characters.

In a telephone system shown in FIG. 1 in which the office line interface circuit of this invention is employed, a signal from an office line L is applied to an office line interface circuit 10 in a main unit 1 where signal is separated into an office line current (DC) and a voice signal. The office line current thus separated is fed back to the office line after flowing through a DC circuit 10A. On the other hand, the voice signal is supplied to a cross-point switch 8 via a transformer 10B. After being subjected to a switching operation effected by the cross-point switch 8, the voice signal is supplied to a receiver 23 through a transformer 21 of a key telephone set 2, a voice transmission line $l_1$, and a sidetone preventing circuit 22. A voice signal inputted from a transmitter 24 of the key telephone set 2 is sent to the office line L via the sidetone preventing circuit 22, transmitter 24, voice transmission line $l_1$, transformer 3, cross-point switch 8 and transformer 10B.

The controller 4 of the main unit 1 and the controller 27 of the key telephone set 2 are interconnected through a parallel/serial converter 5, a transformer 6, a data transmission line $l_2$, a transformer 25 and a parallel/serial converter 26 for mutually exchanging control data. The purpose of the controller 4 is to control the operation of various elements in the main unit 1, while the controller 27 controls various operations of the key telephone set 2.

The operating power of the key telephone set is supplied from the power transformers 3 and 6.

FIG. 1 shows a telephone system in which one key telephone set 2 and one office line interface circuit 10 connected to one office line 10 are provided. Therefore, the description has been made in accordance with FIG. 1. However, the actual telephone system of this type is provided with a plurality of key telephone sets and a plurality of office line interface circuits, each being connected to a respective office line. Please note that FIG. 1 is prepared merely for the purpose of simplifying the description. The same can be said with respect to FIG. 7 and its description.

Figure 2:
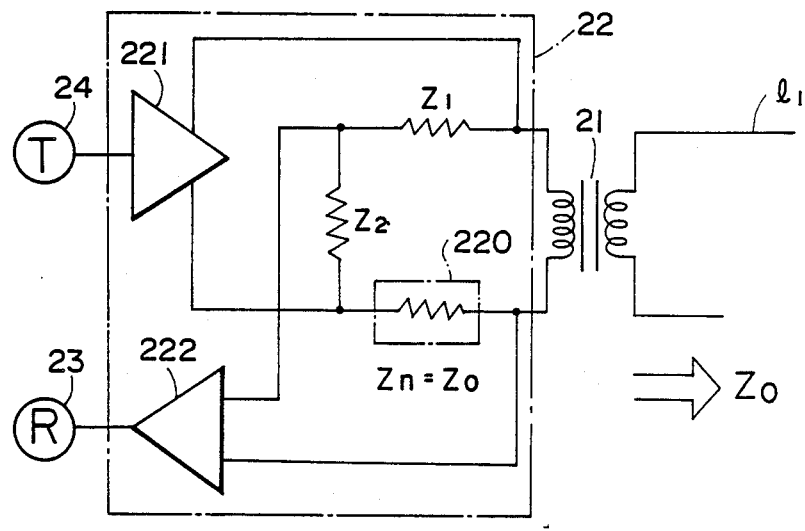
FIG. 2 is a connection diagram showing one example of the sidetone preventing circuit of a key telephone set.

FIG. 2 shows one example of the detail of the sidetone preventing circuit 22 of the key telephone set 2 shown in FIG. 1. The sidetone preventing circuit 22 consists of a bridge circuit including resistors $Z_1$ and $Z_2$, an impedance circuit 220, and a transformer 21. This bridge circuit is connected to the receiver 23 via an amplifier 222 and to the transmitter 24 via an amplifier 221. When the impedance $Z_0$ of the office line L as viewed from the the telephone set is equal to the impedance $Z_n$ of the impedance circuit 220 of the sidetone preventing circuit 22, the desired sidetone preventing effect can be obtained.

Figure 3:
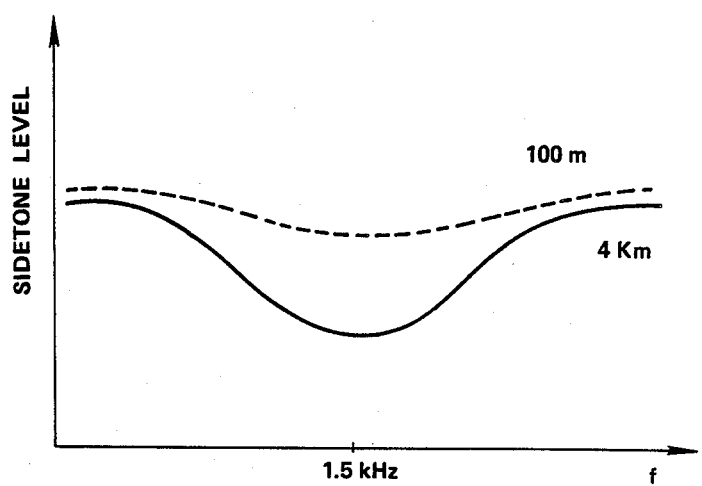
FIG. 3 and 4 are graphs showing the side tone preventing characteristics of the sidetone preventing circuit.
Figure 4:
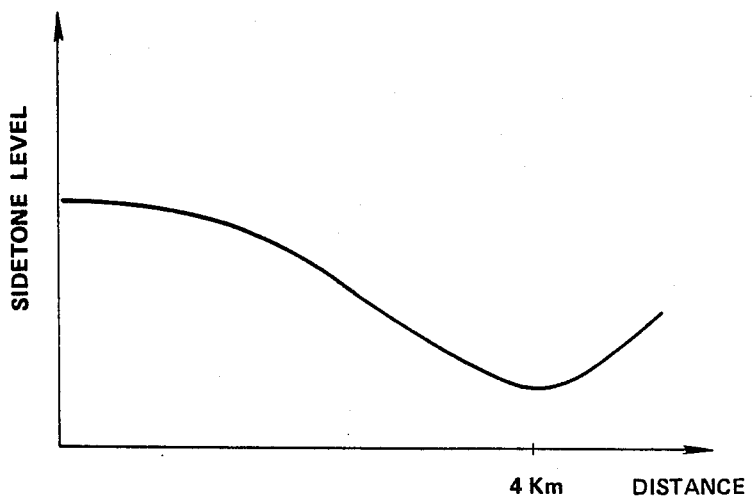

Since the impedance $Z_n$ of the impedance circuit 220 is fixed, a sidetone preventing characteristic as shown in FIG. 3 and 4 can be obtained. FIG. 3 shows the relationship between the side tone level and the frequency, in which dotted lines shows the relation when the distance between the key telephone set and the telephone exchange is short, for example 100 m, which the solid line shows the relation when the distance between the key telephone set and the telephone exchange is long, for example, 4KM. As can be noted from FIG. 3, according to this embodiment, where the distance between the key telephone set and the telephone exchange is large, an advantageous sidetone preventing effect can be provided in a talking voice bandwidth (1.5 Khz) whereas when the distance is small a sufficient sidetone preventing effect cannot be obtained.

FIG. 4 is a graph showing the relation between the sidetone level and the distance between the key telephone set and the telephone exchange. As can be noted from FIG. 4, when the distance between the key telephone set and the telephone exchange is large (4 km), a satisfactory side tone preventing effect can be obtained, whereas when the distance is small sufficient sidetone preventing effect cannot be obtained.

More particularly, the impedance $Z_n$ of the impedance circuit 220 of the sidetone preventing circuit 22 is selected such that satisfactory sidetone preventing effect can be obtained when the distance between the key telephone set and the telephone exchange is large, for example 4 KM.

Figure 5:
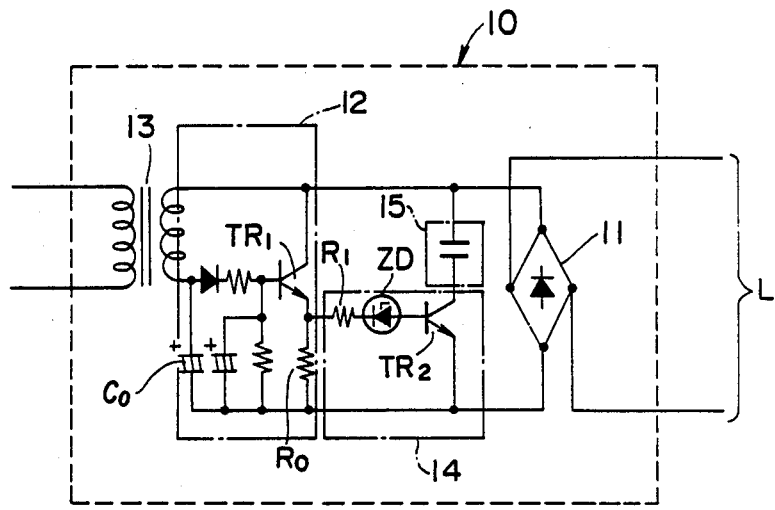
FIG. 5 is a connection diagram showing one embodiment of this office line interface circuit invention.

The office line interface circuit 10 of this invention shown in FIG. 5 will now be described. A signal from the office line L is sent to a DC circuit 12 via a diode bridge 11. The DC circuit 12 consists of the primary winding of interfacing transformer 13 of the key telephone and a capacitor $C_0$ connected in series with the primary winding of the transformer 13. When a transistor $TR_1$ is turned ON by a signal from the primary winding of the transformer 13, a DC component of the office current of the signal from the office line L is fed back to the office line L. The AC component, that is the voice signal, is sent to the cross-point switch via the primary winding of the transformer 13.

A resistor $R_0$ is connected to the emitter electrode of the transistor $TR_1$ of the DC circuit 12, and a voltage proportional to the magnitude of the office line current is derived out from both ends of the resistor $R_0$. The output voltage of the resistor $R_0$ is applied to the switch circuit 14.

The switch circuit 14 comprises a transistor $TR_2$, a resistor $R_1$ and a constant voltage diode or Zener-diode ZD which are serially connected to the base electrode of the transistor $TR_2$, and the terminal voltage of the resistor $R_0$ is supplied to the resistor $R_1$. Consequently, when the distance between the telephone system and the telephone exchange is short so that the office line current and the voltage across the resistor $R_0$ increase; and when this voltage exceeds the breadkdown voltage of the constant voltage diode ZD, the transistor $TR_2$ becomes conductive. An impedance circuit 15, consisting of a capacitive load, for example, is connected between the collector electrode of transistor $TR_2$ and the office line L.

Consequently, as the transistor $TR_2$ becomes conductive, the impedance circuit 15 having a predetermined impedance is connected in parallel with the office line L. Under this condition, the impedance viewed from the office line interface circuit 10 is substantially equal to the impedance in the case of a large distance. For this reason, the sidetone preventing circuit 22 of the key telephone set 2 functions in the same manner as in the case of a large distance.

Of course where the distance between the key telephone system and the telephone exchange is large, the office line current decreases so that transistor $TR_2$ would not be turned ON, thus disconnecting the impedance circuit 15.

It should be understood that the impedance of the impedance circuit 15 is not limited to the capacitive load and that any load can be used so long as it adds to the office line an impedance equivalent to that of the case of a long distance.

In this manner, since a predetermined impedance is connected to the office line by utilizing the increase in the office line current when the distance is short, a satisfactory sidetone preventing characteristic can be provided even in the case of a short distance.

Figure 6:
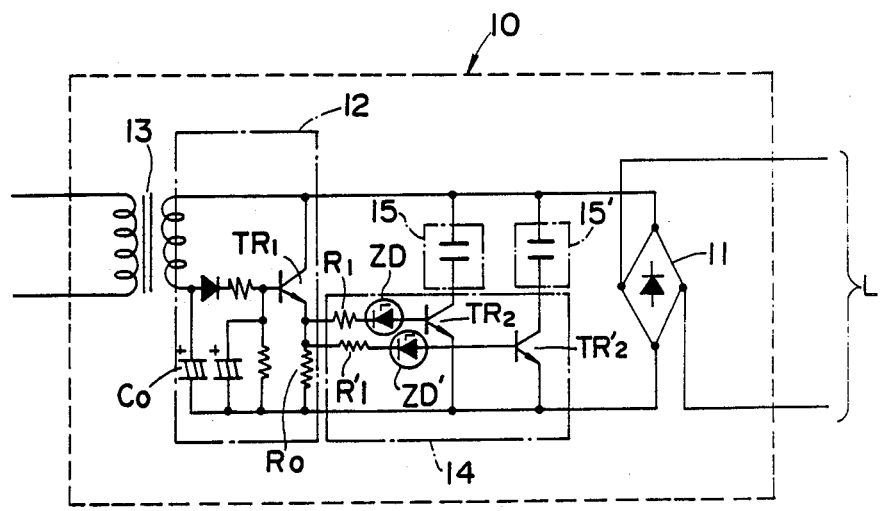
FIG. 6 is a connection diagram showing another embodiment of the office line interface circuit invention.

FIG. 6 shows another example of the office line impedance circuit. In this example, the switch circuit 14 consists of two circuits, one including transistor $TR_2$, resistor $R_1$ and a constant voltage diode ZD, and the other including transistor $TR_2'$, resistor $R_1'$ and constant voltage diode ZD'. Thus the switch circuit 14 is constructed to selectively connect either one of two impedance circuits 15 and 15' to the office line L. With this construction, it is possible to change, in two steps, the impedance to be connected to the office line, thereby enabling fine control of the impedance. Further, instead of providing two circuits for the switch circuit 14 and the impedance circuits, circuits of more than two can be provided.

Figure 7:
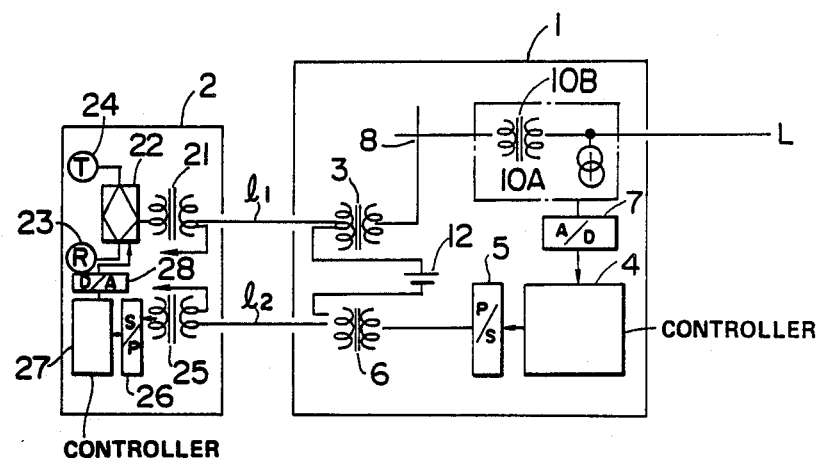
FIG. 7 is a connection diagram showing the construction of a key telephone system to which still another embodiment of this invention is applicable.

FIG. 7 is a connection diagram of a key telephone set to which a modified embodiment of this invention is applied. In this modification, a circuit for controlling the gain of the amplifier for the receiver of the key telephone set in accordance with the office line current is added to the circuit shown in FIGS. 1, 2 and 5.

Figure 8:
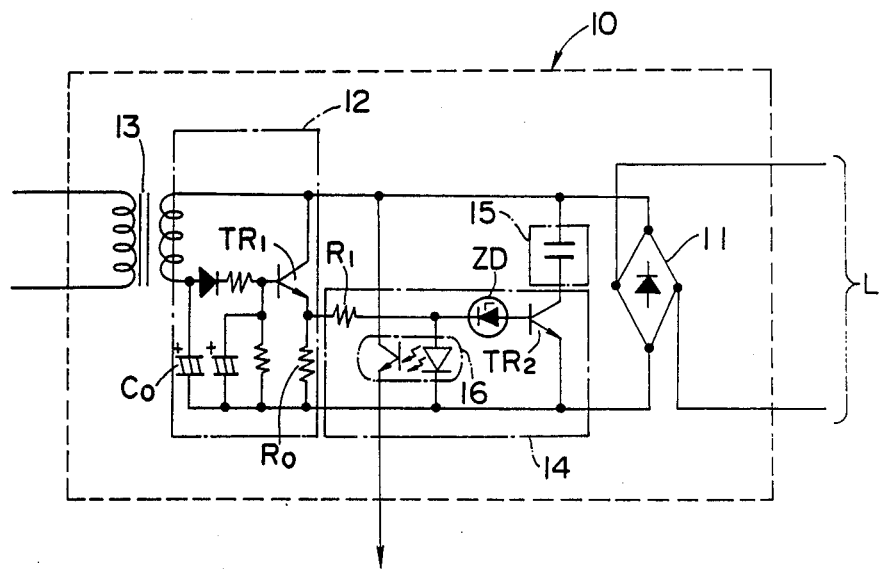
FIG. 8 is a connection diagram showing yet another embodiment of the office line interface circuit invention.
Figure 9:
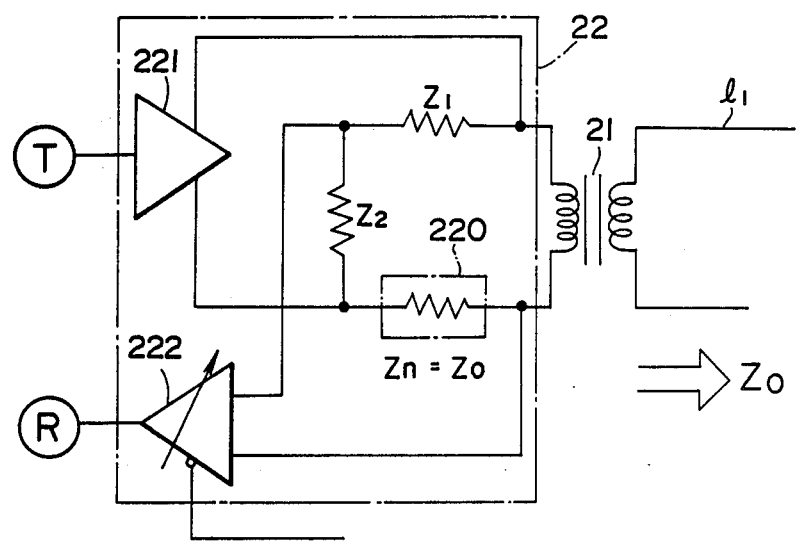
FIG. 9 is a connection diagram showing one example of the sidetone preventing circuit of a key telephone set utilized in the embodiment shown in FIG. 7.

More particularly, the office line current is derived out by using a photocoupler 16 of an office line trunk circuit 10 shown in FIG. 8. The office line current is converted into a digital signal by an analog/digital converter 7, and the digital signal is supplied to controller 4. The controller 4 supplies the digital signal to the parallel/serial converter 5 to produce a serial signal which is supplied to a parallel/serial converter 26 via transformer 6, data transmission line l₂ and transformer 25. The parallel/signal produced by the parrallel/serial converter 26 is supplied to controller 27. The output of this controller 27 is converted into an analog signal by a digital/analog converter 28, and the analog signal is applied to sidetone preventing circuit 22. According to this embodiment, as shown in FIG. 9, in the sidetone preventing circuit 22, the amplifier 222 of the receiver is of the variable gain type and the gain of this amplifier 222 is controlled by the analog signal outputted by the digital/analog converter and corresponding to the office line current. As a consequence, where the office line current is large, the gain of the amplifier 222 is large and vice versa. Accordingly, when the office line current is large, the receiving level of the receiver is low and vice versa. This provides a favorable sidetone preventing effect as well as a high quality receiving tone.

What is claimed is:

1. An office line interface circuit for interfacing an office line with a telephone set having a receiver, a transmitter, and a sidetone preventing circuit connected between said receiver and said transmitter, the office line interface circuit comprising:

direct current circuit means, coupled to said office line, for extracting a direct current signal component flowing through said office line;

alternating current circuit means, coupled to said office line, for extracting an alternating current signal component from said office line current and for providing the extracted alternating current signal component to said receiver of said telephone set;

an impedance circuit switchably connected to said office line and coupled to said direct current circuit means;

switching circuit means, coupled to said direct current circuit means, for performing switching operations to connect said impedance circuit to said office line when said direct current signal component extracted by said direct current circuit means exceeds a predetermined level to maintain at a substantially constant value an impedance, as viewed from said telephone set, of said office line;

amplifier means, coupled to said alternating current circuit means, for amplifying said alternating current signal component extracted by said alternating current circuit means and for providing said amplified alternating current signal to said receiver of the telephone set;

detecting means, coupled to said direct current circuit means, for detecting the level of the direct current signal component extracted by said direct current circuit means; and control means, coupled to said detecting means and to said amplifier means, for controlling the gain of said amplifier means in accordance with the output of said detecting means.

2. The office line interface circuit as claimed in claim 1 wherein said impedance circuit comprises a capacitor.

3. The office line interface circuit as claimed in claim 1 wherein said control means comprises:

conversion means coupled to said detecting means for converting the output of said detecting means into a digital signal and means for converting said digital signal into a serial signal and for applying said serial signal to said amplifier.

4. An office line interface circuit for interfacing an office line with a telephone set having a receiver, the circuit comprising:

direct current circuit means, coupled to said office line, for extracting a direct current signal component flowing through said office line;

alternating current circuit means, coupled to said office line, for extracting an alternating current signal component from said office line current and for providing the extracted alternating current signal component to said receiver of said telephone set;

an impedance circuit switchably connected to said office line and coupled to said direct current circuit means;

switching circuit means, coupled to said direct current circuit means, for performing switching operations to connect said impedance circuit to said office line when said direct current signal component extracted by said direct current circuit means exceeds a predetermined level;

amplifier means, coupled to said alternating current circuit means, for amplifying said alternating current signal component extracted by said alternating current circuit means and for providing said amplified alternating current signal to said receiver of the telephone set;

detecting means, coupled to said direct current circuit means, for detecting the level of the direct current signal component extracted by said direct current circuit means; and control means, coupled to said detecting means and to said amplifier, for controlling the gain of said amplifier means in accordance with the output of said detecting means, said control means comprising conversion means coupled to said detecting means for converting the output of said detecting means into a digital signal and means for converting said digital signal into a serial signal and for applying said serial signal to said amplifier means.

5. The office line interface circuit as claimed in claim 4 wherein said impedance circuit comprises a capacitor.

* * * * *